B. F. HALVORSEN.
METHOD OF MAKING SOLID FERTILIZERS.
APPLICATION FILED APR. 25, 1908.
936,317.  Patented Oct. 12, 1909.
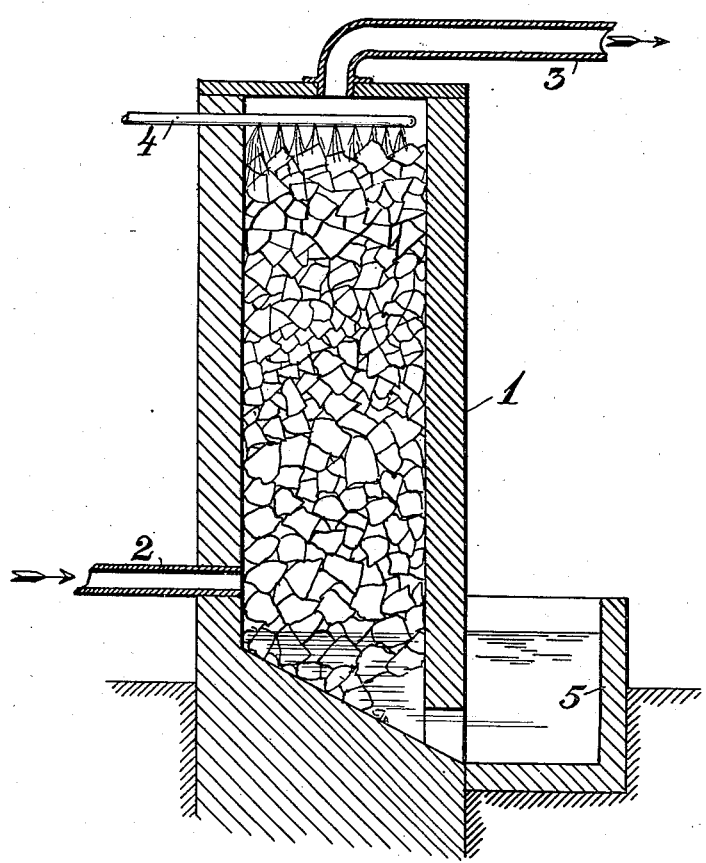
Witnesses.  Inventor.

UNITED STATES PATENT OFFICE.

BIRGER FJELD HALVORSEN, OF CHRISTIANIA, NORWAY, ASSIGNOR TO NORSK HYDRO-ELEKTRISK KVAELSTOFAKTIESELSKAB, OF CHRISTIANIA, NORWAY.

METHOD OF MAKING SOLID FERTILIZERS.

936,317. Specification of Letters Patent. Patented Oct. 12, 1909.

Application filed April 25, 1908. Serial No. 429,206.

*To all whom it may concern:*

Be it known that I, BIRGER FJELD HALVORSEN, a subject of the King of Norway, residing at Christiania, Norway, have invented certain new and useful Improvements in the Method of Manufacturing a Solid Fertilizer; and I do hereby declare the following to be a full, clear, and exact description of the invention, such as will enable others skilled in the art to which it appertains to make and use the same.

My invention relates to a method of manufacturing a solid fertilizer containing nitrogen and phosphoric acid.

In the modern manufacture of nitric acid from atmospheric air there is obtained as a primary product a cheap, but rather dilute nitric acid. It is advantageous to utilize this dilute nitric acid as a solvent for phosphates, instead of sulfuric acid, which is at present generally employed for this purpose. The advantages which may be obtained by such a procedure are obvious, the sulfuric acid adding to the fertilizer only a valueless component, while the nitric acid supplies to it additional plant food, namely, nitrogen.

The process at the first glance appears to be very simple. The phosphate (for instance a poor or valueless apatite) is dissolved in an equivalent quantity of the acid, thereby obtaining a solution of mono-calcium-phosphate and calcium nitrate. The difficulty lies in transforming the substance into a solid. By adding lime or calcium carbonate the so-called di-phosphate may, of course, be precipitated, leaving a remainder of pure calcium nitrate; this would, however, impair the value of the product in the first place, (as di-calcium-phosphate is of less value than mono-calcium-phosphate,) and, further, entails expenses for lime, filtering operations, (which are very difficult,) and for evaporation.

It is difficult to effect a direct evaporation of the solution, first, because it is difficult to procure a suitable material for the evaporation pans, that is to say, a material capable of resisting the action of the acid liquor, and, secondly, because loss of nitric acid and reversion of the phosphoric acid are liable to arise, because the phosphoric acid expels nitric acid when heated. The latter difficulty, however, may be remedied to a certain extent, if not entirely avoided, by effecting the evaporation at a low temperature, for instance in vacuum.

My invention has for its object to avoid all the difficulties mentioned above, and to produce a valuable solid substance in which phosphoric acid is present in its most advantageous condition, namely, as a mono-calcium-phosphate entirely soluble in water, a suitable apparatus for carrying out my process being shown in the accompanying drawing in vertical section.

The process is suitably carried out in the following manner: The dilute, 40% nitric acid produced from atmospheric air is employed for dissolving an equivalent quantity of tri-calcium-phosphate according to the following equation:

$$Ca_3(PO_4)_2 + 4HNO_3 = CaH_4(PO_4)_2 + 2Ca(NO_3)_2.$$

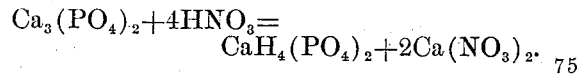

The solution is suitably effected in irrigation towers filled with phosphate, for example as shown in the accompanying drawing, or in lixiviating vessels, as may be preferred. In both cases the principle of counter-current is applied, and heating is preferably provided for by means of hot gases from electric furnaces in which oxids of nitrogen are being produced.

In the apparatus illustrated in the drawing the hot gases enter the irrigating tower 1 through pipe 2 at the bottom and escape through pipe 3 at the top of the tower. The acid is supplied by means of the sprinkler pipe 4, passes over the phosphate rock, which is in the tower, and is collected in the basin 5 at the base of the tower. To the acid solution obtained, in one way or another, is added a quantity of calcined calcium nitrate still warm from the calcination, and corresponding to the quantity of water in the acid solution. Some of the water is thereby evaporated, and the remaining quantity is bound chemically by the calcium nitrate as water of crystallization. So much calcium nitrate is added, that there is, in total, $3H_2O$ to each molecule of $Ca(NO_3)_2$. Owing to the evaporation, a product is obtained containing at least 15% $P_2O_5$ and 11% N; and on being cooled the entire product coagulates to a solid, hard mass, which can be crushed into a powder.

The calcination of the nitrate of lime is suitably effected by heating it directly with the gas from the furnaces or with hot air in rotating drums. The quantity of gas to be passed through the drum is successively made greater in order that the temperature may be kept below the smelting-temperature of the nitrate. The smelting point is the higher the more water is evaporated. The temperature must never go over 300° C., in order to avoid destruction of the nitrate. The successive raising of the temperature may easily be controlled by the quantity of gas, which is let in through a throttle valve.

I claim—

1. Method of manufacturing a solid fertilizer, containing nitrogen and phosphoric acid, which comprises dissolving phosphates in dilute nitric acid and adding calcined calcium nitrate to the resulting solution in such a quantity as to unite with the excess of water present as water of crystallization.

2. Method of manufacturing a solid fertilizer containing nitrogen and phosphoric acid, which comprises dissolving phosphates in nitric acid, and adding hot calcined calcium nitrate.

In testimony that I claim the foregoing as my invention, I have signed my name in presence of two subscribing witnesses.

BIRGER FJELD HALVORSEN.

Witnesses:
　HENRY BORDEWICH,
　MICHAEL ALGER.